US012679277B2

(12) United States Patent
Miyake

(10) Patent No.: US 12,679,277 B2
(45) Date of Patent: Jul. 14, 2026

(54) CONSOLE FOR VEHICLE

(71) Applicant: MORIROKU TECHNOLOGY COMPANY, LTD., Tokyo (JP)

(72) Inventor: Norifumi Miyake, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 333 days.

(21) Appl. No.: 18/601,801

(22) Filed: Mar. 11, 2024

(65) Prior Publication Data

US 2024/0359628 A1     Oct. 31, 2024

(30) Foreign Application Priority Data

Apr. 26, 2023     (JP) ................................. 2023-072469

(51) Int. Cl.
B60R 7/04 (2006.01)
B60N 2/75 (2018.01)
B60N 3/10 (2006.01)

(52) U.S. Cl.
CPC ................ B60R 7/04 (2013.01); B60N 2/753 (2018.02); B60N 3/101 (2013.01)

(58) Field of Classification Search
CPC ........ B60N 2/753; B60N 2/793; B60N 3/101; B60R 7/04; B60R 11/0241
See application file for complete search history.

(56) References Cited

U.S. PATENT DOCUMENTS 7,784,843 B2 *   8/2010  Lota ....................... B60N 3/102
                                                    296/37.8
10,040,397 B1 *  8/2018  Wuerthele ................. B60R 7/04
2003/0047955 A1   3/2003  Bruhnke et al.

FOREIGN PATENT DOCUMENTS

JP       H04-176743 A      6/1992
JP       2002-079887 A     3/2002
JP        2020-32977 A      3/2020

* cited by examiner

*Primary Examiner* — Lori Lyjak
(74) *Attorney, Agent, or Firm* — Rankin, Hill & Clark LLP

(57) ABSTRACT

A console for vehicle includes a console main body, a placing portion provided at a top of the console main body to allow belongings to be placed thereon, an armrest supported from a retracted position which is a side of the console main body to a rest position above the retracted position in a swingable manner to allow an occupant to place an arm thereon when the armrest is located at the rest position, and a falling-of-belongings suppression mechanism interlocked with swing of the armrest and configured to suppress falling of the belongings placed on the placing portion when the armrest is located at the rest position.

4 Claims, 7 Drawing Sheets

CONSOLE FOR VEHICLE

FIELD OF THE INVENTION

The present invention relates to a console for vehicle provided on a side of an occupant.

BACKGROUND

Some vehicles have a console for vehicle between right and left front seats. The console for vehicle is located on a side of an occupant and is capable of storing belongings of the occupant and holding drinks. As a conventional technology related to such a console for vehicle, there is a technology disclosed in Japanese Application No. 2020-32977.

The console disclosed in Japanese Application No. 2020-32977 includes a box-shaped main body capable of storing belongings and a lid provided to be swingable upward from a side of the main body. The lid serves as a cover for the main body when positioned above the main body, and can also be used as an armrest for placing an arm of the occupant.

SUMMARY

In some consoles, a main body does not have a box shape and has a top surface formed in a substantially flat shape. In such a console, relatively small belongings such as a smartphone, a key, and a coin purse can be placed on the top surface. It is conceivable to use the swingable armrest disclosed in Japanese Application No. 2020-32977 in such a console whose top surface has a substantially flat shape. In this case, when the armrest is moved upward, the placed belongings cannot be recognized. For this reason, there is a desire for measures to suppress falling of belongings.

According to the present disclosure, there is provided a console for vehicle including a console main body, a placing portion provided at a top of the console main body to allow belongings to be placed thereon, an armrest supported from a retracted position which is a side of the console main body to a rest position above the retracted position in a swingable manner to allow an occupant to place an arm thereon when the armrest is located at the rest position, and a falling-of-belongings suppression mechanism interlocked with swing of the armrest and configured to suppress falling of the belongings placed on the placing portion when the armrest is located at the rest position.

According to the disclosure, a console for vehicle capable of inhibiting belongings from falling is provided.

DETAILED DESCRIPTION

Embodiments of the invention will be described below based on the accompanying drawings. In addition, in the description, right and left indicate right and left based on an occupant of a vehicle, and front and rear indicate front and rear based on a traveling direction of the vehicle. Further, in the figure, Fr indicates the front, Rr indicates the rear, Le indicates the left when viewed from the occupant, Ri indicates the right when viewed from the occupant, Up indicates a top, and Dn indicates a bottom.

First Embodiment

A first embodiment will be described based on the drawings.

Figure 1:
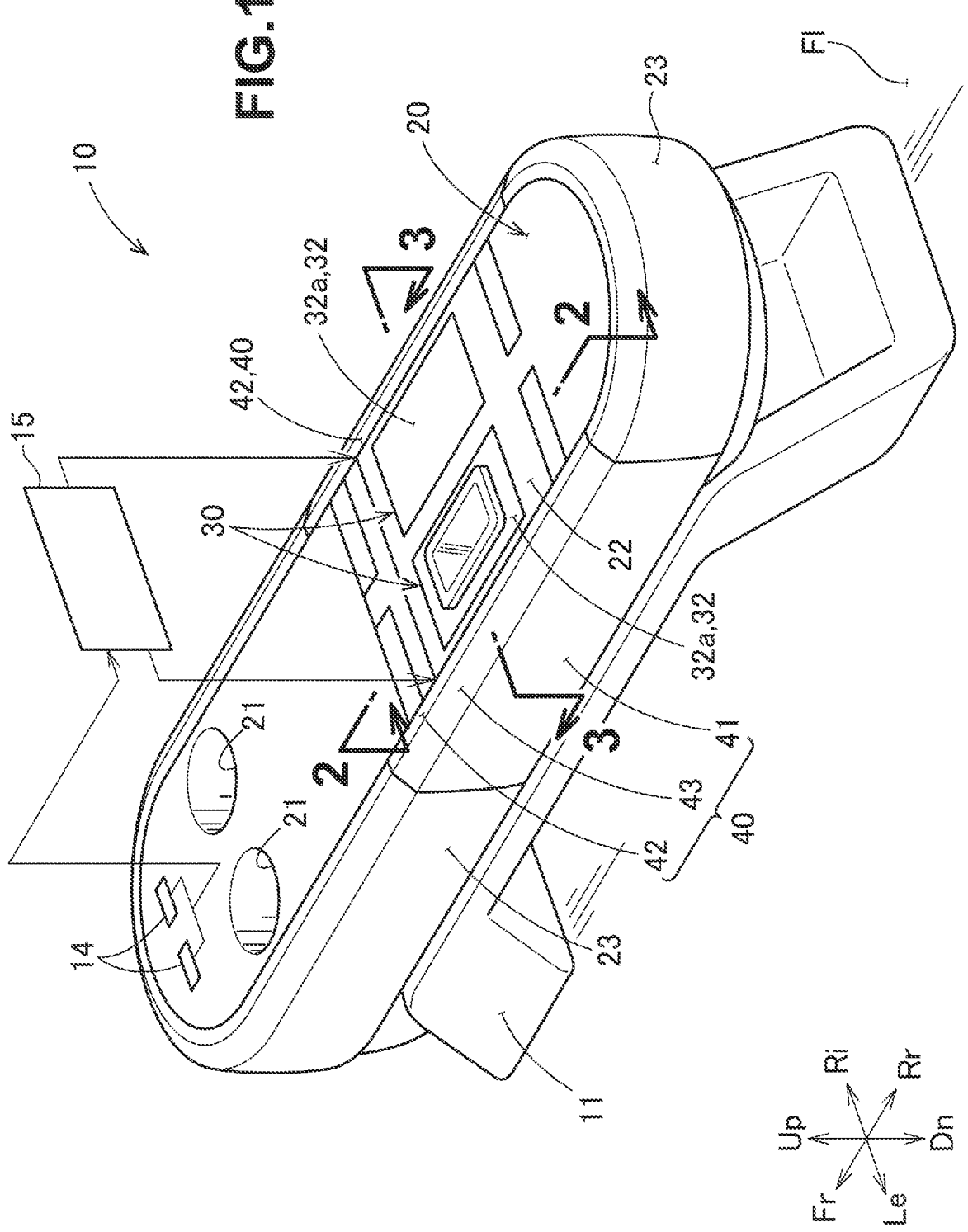
FIG. 1 is a perspective view of a console for vehicle according to a first embodiment.

Referring to FIG. 1, a console for vehicle 10 (hereinafter abbreviated as "console 10") is used by being provided between front and rear seats. The console 10 includes a leg portion 11 fixed to a floor Fl of a vehicle interior, a console main body 20 supported on an upper portion of the leg portion 11, a placing portion 30 provided on an upper portion of the console main body 20 to allow belongings Hb to be placed thereon, and an armrest 40 swingable from a side to a top of the console main body 20.

The console 10 further includes a switch 14 facing a top surface of the console main body 20 and operable by the occupant to switch a position of the armrest 40. A controller 15 receiving an operation signal when the switch 14 is operated is connected to the switch 14. Upon receiving the operation signal from the switch 14, the controller 15 operates a motor (not illustrated) to swing the armrest 40 to a predetermined position based on the operation signal.

Figure 2:
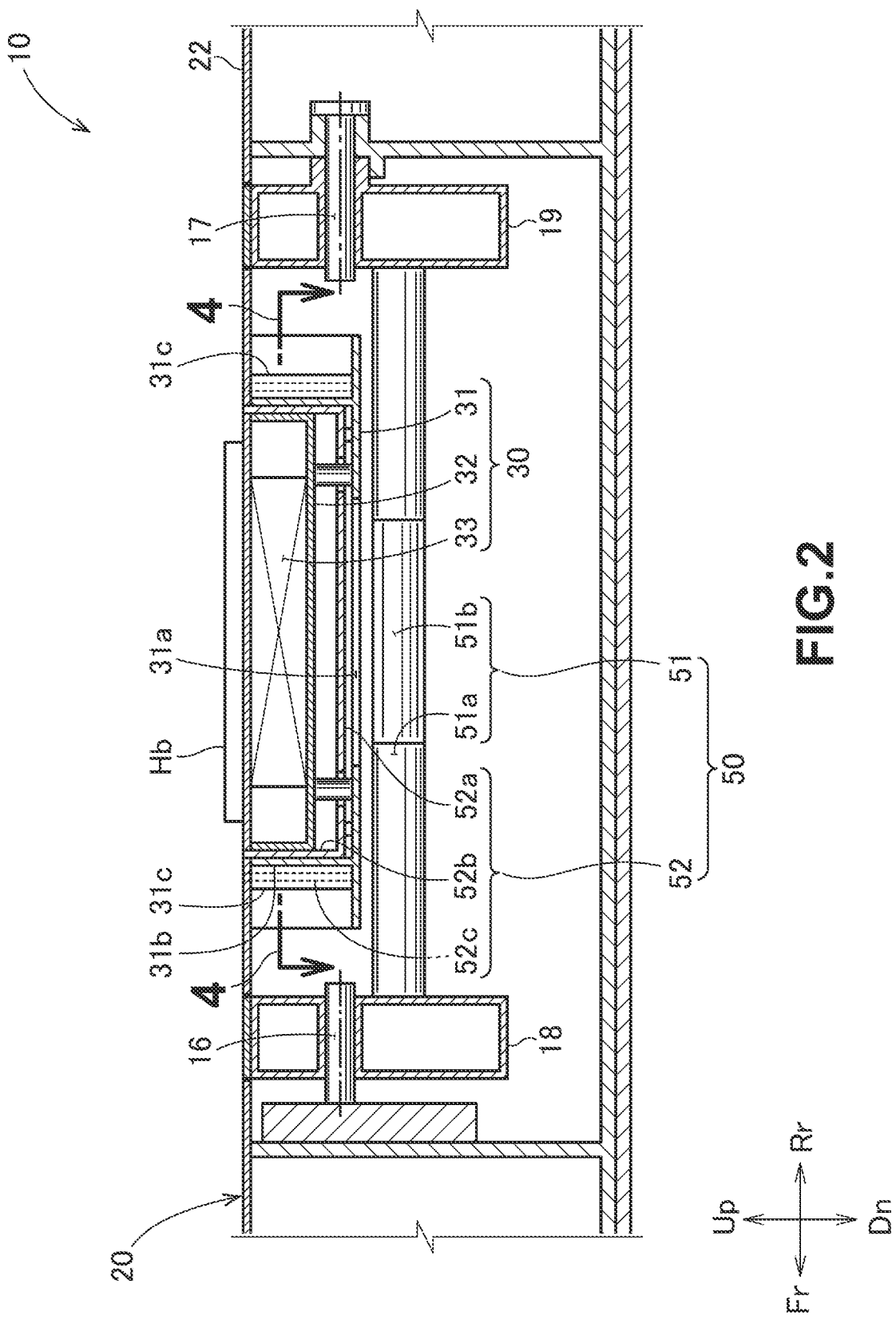
FIG. 2 is a cross-sectional view taken along line 2-2 of FIG. 1.

Referring to FIG. 2, the console 10 further includes a front shaft 16 and a rear shaft 17, which are rotating shafts fixed to the console main body 20, a front support 18 supported by the front shaft 16 in a swingable manner to support the armrest 40 (see FIG. 1), a rear support 19 supported by the rear shaft 17 in a swingable manner to support the armrest 40 (see FIG. 1), and a falling-of-belongings suppression mechanism 50 supported by the front support 18 and the rear support 19 and capable of suppressing falling of the belongings Hb placed on the placing portion 30.

Examples of the belongings Hb placed on the placing portion 30 include a smartphone. In addition, belongings such as a wallet, a key, a cigarette, and a heating device for an electronic cigarette are considered as the belongings Hb that can be placed on the placing portion 30. However, other items can also be placed.

Referring to FIG. 1, the console main body 20 has a drink holder 21 formed in a downwardly concave shape and capable of holding a drink of the occupant. A main body top surface 22 included in the top surface of the console main body 20 is formed on substantially the same surface except for a portion where the drink holder 21 is formed.

An outer circumferential surface of the console main body 20 is surrounded by a side wall member 23 except for a portion where the armrest 40 is disposed. An upper end of the side wall member 23 is located at a higher position than that of the main body top surface 22.

Figure 3:
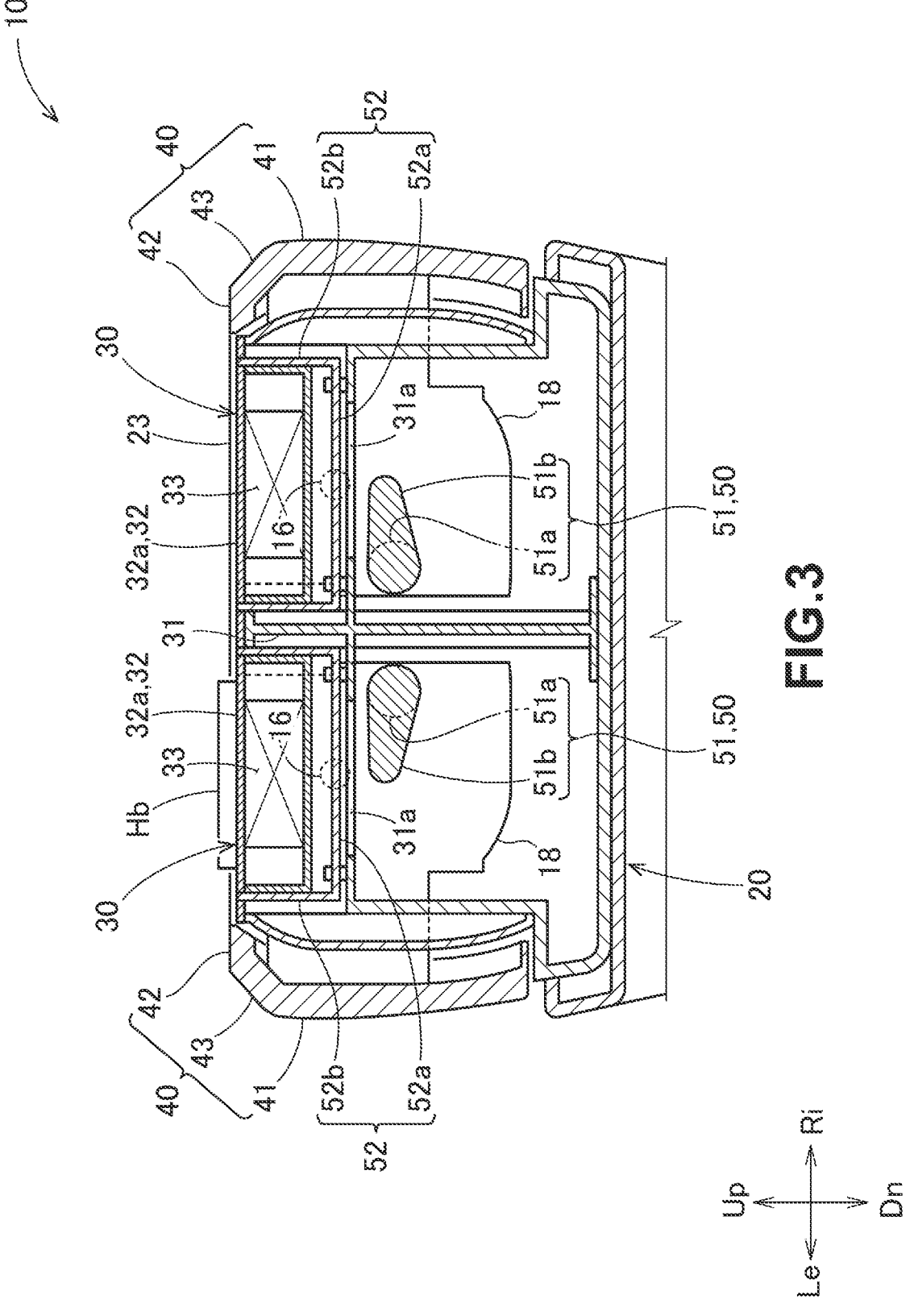
FIG. 3 is a cross-sectional view taken along line 3-3 of FIG. 1.

Referring to FIG. 2 and FIG. 3, the placing portion 30 includes a placing portion base 31 fixed to a lower surface of the main body top surface 22, and a placing portion main body 32 provided inside the placing portion base 31 and allowing the belongings Hb to be placed on a top surface thereof.

A base hole 31*a* is formed in a bottom surface of the placing portion base 31.

Figure 4:
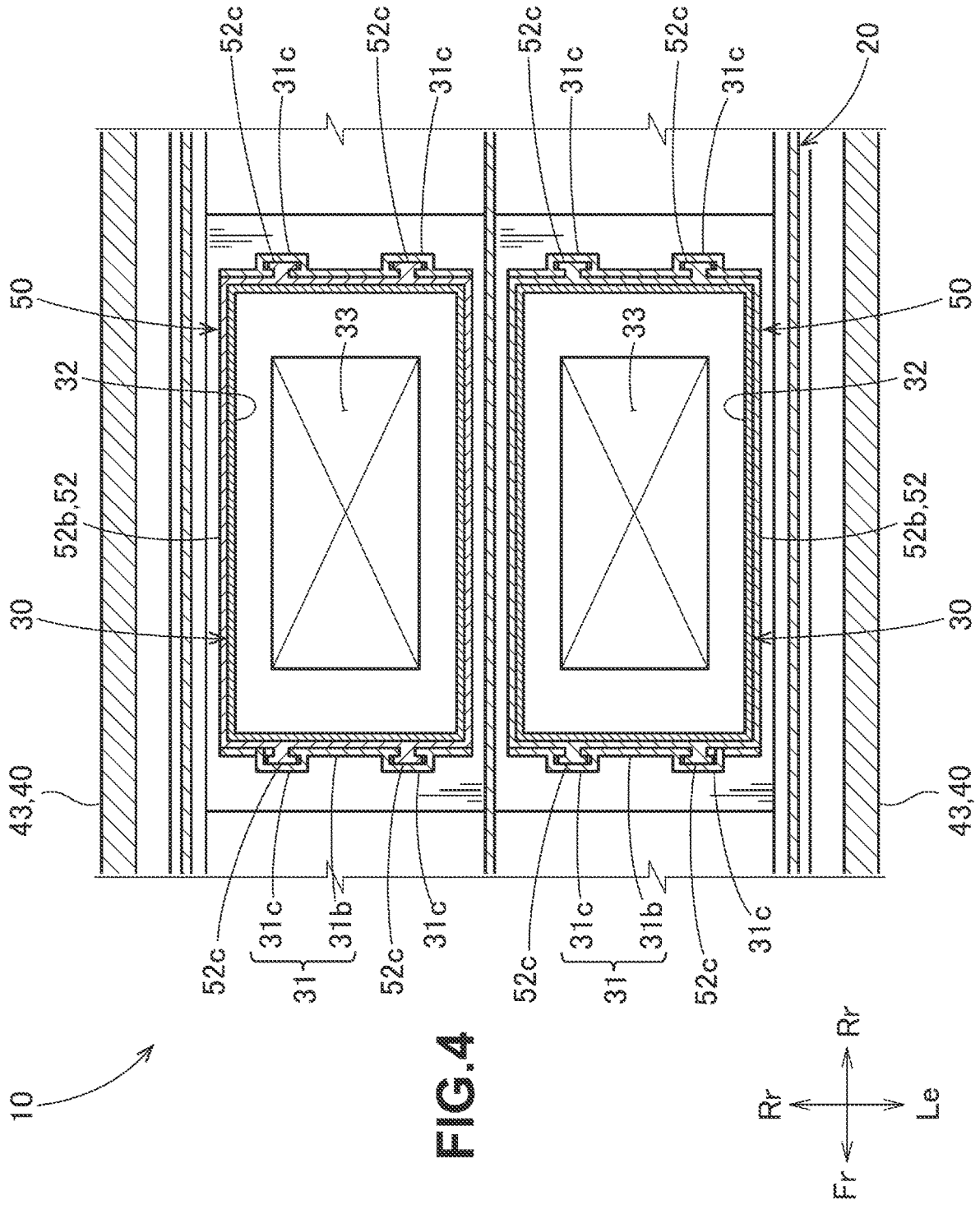
FIG. 4 is a cross-sectional view taken along line 4-4 of FIG. 2.

Referring to FIG. 4, a guide groove 31*c* for guiding the falling-of-belongings suppression mechanism 50 is integrally formed on a side wall 31*b* of the placing portion base 31.

Referring to FIG. 2, the placing portion main body 32 has a box shape, and a charging device 33 capable of charging a smartphone may be incorporated therein. For example, the charging device 33 is a wireless type charging device not requiring connection to the smartphone using a cord.

A placing top surface 32*a*, which is a top surface of the placing portion main body 32, is located substantially on the same plane as that of the main body top surface 22. As a result, most of the top surface of the console 10 is formed in a flat shape.

Referring to FIG. 1, the armrest 40 is located at a retracted position in a state illustrated in FIG. 1. In this case, the occupant cannot place an arm on the armrest 40. The occupant can move the armrest 40 to a rest position above the console main body 20 by operating the switch 14. When the armrest 40 is located at the rest position, the occupant can place the arm on the armrest 40. Details will be described later.

An outer circumferential surface of the armrest 40 has the same shape as that of an outer circumferential surface of the side wall member 23 when the armrest 40 is located at the retracted position. As a result, the outer circumferential surface of the console main body 20 is continuously surrounded by the side wall member 23 and the armrest 40.

The armrest 40 includes a rest surface 41 on which the occupant can place the arm when the armrest 40 is located at the rest position, an upper end portion 42 located at an upper end when the armrest 40 is located at the retracted position, and a connecting surface 43 that connects the rest surface 41 and the upper end portion 42. Each of the rest surface 41, the upper end portion 42, and the connecting surface 43 has a shape continuous from the side wall member 23.

Referring to FIG. 3, the upper end portion 42, which is an upper end of the armrest 40, is located at a position higher than the placing portion 30.

Referring to FIG. 1, note that the armrest 40 may be movable from a rear surface to the top surface, or may be movable from a front surface to the top surface. In other words, sides of the console main body 20 include not only the vicinity of side surfaces of the console main body 20 but also the vicinity of the front surface and the vicinity of the rear surface.

Further, the armrest 40 does not have to be swung by a motor, and may be manually swung by the occupant.

As the switch 14, for example, a capacitive touch switch can be used. However, a button type or plunger type switch can also be used. In other words, any type of switch can be employed.

Even though the controller 15 is schematically illustrated, the controller 15 can be disposed anywhere, such as inside the console main body 20.

The controller 15 includes, for example, a CPU, a ROM in which a program executed by the CPU and various data are stored, a RAM used as a working memory, etc. for the CPU, and an EEPROM that is a nonvolatile memory.

For example, a stepping motor can be used as a motor energized and operated by an electric signal from the controller 15. By interlocking using a gear, etc., it is possible to swing a plurality of armrests 40 using one motor. Alternatively, it is also possible to provide a motor corresponding to each armrest 40.

Referring to FIG. 2, the front shaft 16 and the rear shaft 17 are both formed of round bar-shaped members and are disposed on the same shaft extending in a front-rear direction.

Referring to FIG. 3, the falling-of-belongings suppression mechanism 50 includes a cam 51 supported by the front support 18 and the rear support 19 (see FIG. 2), and an elevating portion 52 that moves up and down when the cam operates.

The cam 51 has a round bar-shaped cam shaft 51*a* and a cam main body 51*b* protruding radially outward from the cam shaft 51*a* below the elevating portion 52.

The elevating portion 52 includes an elevating floor 52*a* facing the base hole 31*a*, and a fall suppression wall 52*b* that suppresses falling of the belongings Hb from the placing portion 30 when raised from the elevating floor 52*a*. When the armrest 40 is located at the retracted position, an upper end of the fall suppression wall 52*b* is at the same height as that of the main body top surface 22.

Note that the upper end of the fall suppression wall 52*b* may be located at a position lower than the main body top surface 22.

Referring to FIG. 4, a protrusion 52*c* protruding toward the guide groove 31*c* and inserted into the guide groove 31*c* is formed in a portion of the fall suppression wall 52*b*.

An action of the console 10 will be described.

Figure 5:
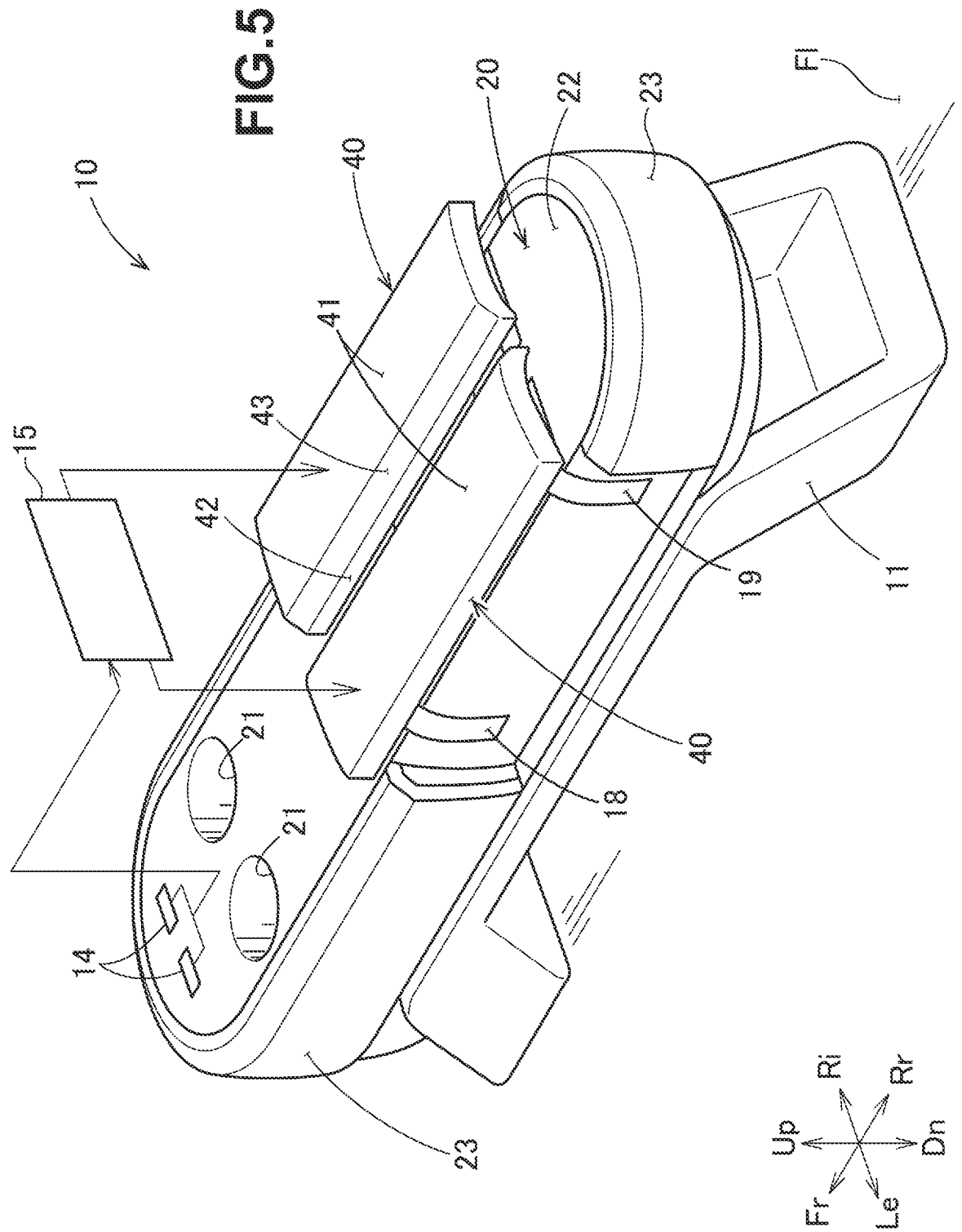
FIG. 5 is a diagram for describing an action of an armrest illustrated in FIG. 1.

Referring to FIG. 5, FIG. 5 illustrates a state in which the armrest 40 is located at the rest position. In order to be able to place the arm on the armrest 40, the occupant needs to displace the armrest 40 to the rest position.

Specifically, when the occupant operates the switch 14 to displace the armrest 40 to the rest position, an electrical signal is transmitted to the controller 15. When the controller 15 operates the motor by energization, the armrest 40 is displaced. When the armrest 40 is displaced to the rest position, the controller 15 stops energizing the motor.

Figure 6:
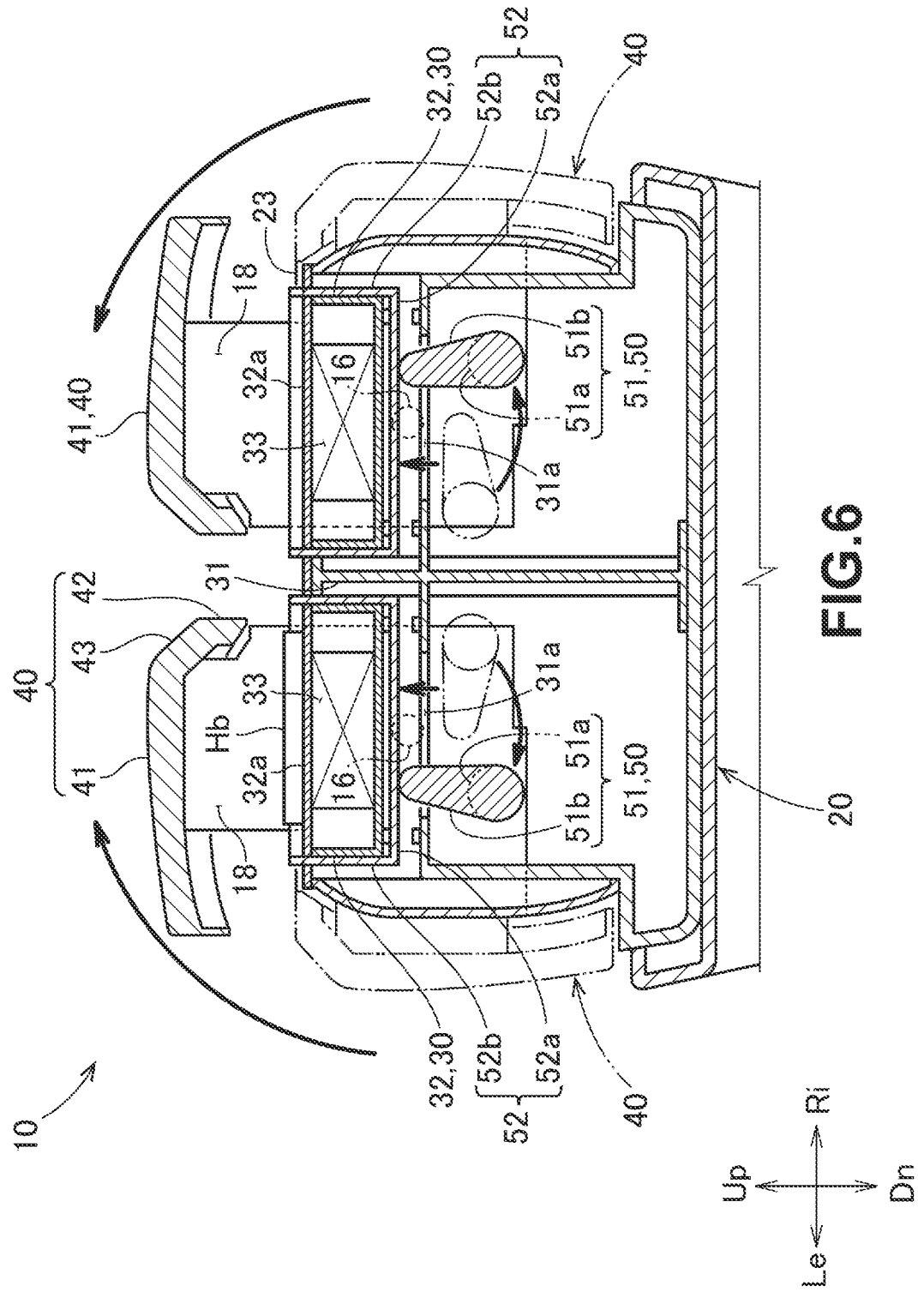
FIG. 6 is a cross-sectional view of a state in which the armrest illustrated in FIG. 5 is viewed from a rear.

Referring to FIG. 2 and FIG. 6, when the armrest 40 is displaced, the front support 18, the rear support 19, and the falling-of-belongings suppression mechanism 50 are also displaced. The front shaft 16, the rear shaft 17, and the placing portion 30 are not displaced.

More specifically, in the falling-of-belongings suppression mechanism 50, as the cam 51 rotates around the front shaft 16 and the rear shaft 17, a tip of the cam main body 51*b* comes into contact with the elevating floor 52*a*. By further rotating the cam 51 in a contact state, the elevating portion 52 is lifted by the cam 51, and the elevating portion 52 is raised. As a result, the fall suppression wall 52*b* is displaced above the main body top surface 22 and the placing top surface 32*a*.

By rising the fall suppression wall 52*b* above the placing top surface 32*a*, it is possible to inhibit the belongings Hb from sliding out of the placing portion 30. In this way, falling of belongings Hb from the console 10 can be suppressed.

When the armrest 40 is displaced from the rest position to the retracted position, the cam 51 is also displaced by being interlocked, and the cam main body 51*b* falls down to face the side. As a result, the tip of the cam main body 51*b* gradually lowers, and the elevating portion 52 supported by the cam main body 51*b* also lowers due to a weight thereof.

After the elevating portion 52 is displaced to a position where the elevating portion 52 is in contact with the placing portion base 31, the cam main body 51*b* further falls down, thereby separating the cam main body 51*b* from the elevating portion 52.

Second Embodiment

Next, a second embodiment will be described based on the drawings.

Figures 7A, 7B:
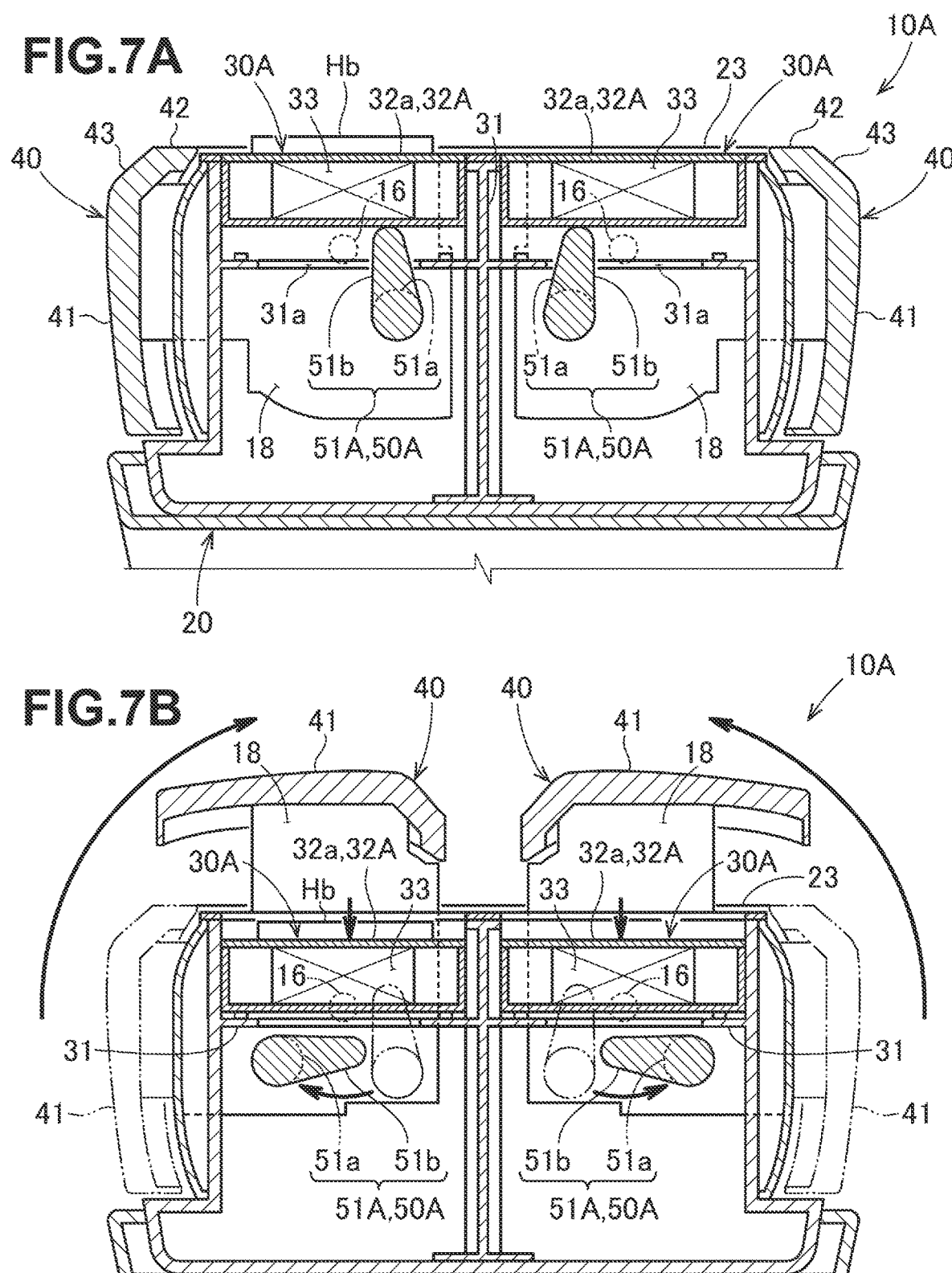
FIG. 7A is a cross-sectional view of a console for vehicle according to a second embodiment.
FIG. 7B is a diagram for describing an action of the console for vehicle illustrated in FIG. 7A.

Referring to FIG. 7A, a cross-sectional configuration of a console 10A according to the second embodiment is illustrated in FIG. 7A. For portions common to the first embodiment, reference numerals are reused and detailed descriptions are omitted.

In the console 10A according to the second embodiment, a falling-of-belongings suppression mechanism 50A only includes a cam 51A, and in a retracted state, the cam main body 51*b* faces upward and is in contact with a placing portion main body 32A. The placing portion 30A on which the belongings are placed is provided such that the placing portion main body 32A can be raised and lowered. Other basic configurations are the same as those of a damper mechanism according to the first embodiment.

When the armrest 40 is at the retracted position, the cam main body 51*b* faces upward and is in contact with the elevating floor 52*a*. In this instance, the placing top surface 32*a* is located at approximately the same height as that of the main body top surface 22.

Referring to FIG. 7B, when the armrest 40 is displaced toward the rest position, the cam 51 is also displaced by being interlocked, and the cam main body 51*b* falls down to face the side. As a result, the tip of the cam main body 51*b* gradually lowers, and the placing portion main body 32A supported by the cam main body 51*b* also lowers due to a weight thereof. After the placing portion main body 32A is displaced to a position where the placing portion main body 32A is in contact with the placing portion base 31, the cam main body 51*b* further falls down, thereby separating the cam main body 51*b* from the placing portion main body 32A.

When the placing portion main body 32A is supported by the placing portion base 31, the placing top surface 32*a* is located at a position lower than the main body top surface 22. An edge of the main body top surface 22 inhibits the belongings Hb from sliding out of the placing top surface 32*a*.

When the armrest 40 is displaced from the rest position to the retracted position, the placing portion main body 32A is raised by the tip of the cam main body 51*b* to a position where the placing top surface 32*a* is approximately at the same height as that of the main body top surface 22.

The consoles 10 and 10A described above are summarized below.

Referring to FIG. 2 and FIG. 6, first, the console 10 includes the console main body 20, the placing portion 30 provided at a top of the console main body 20 to allow the belongings Hb to be placed thereon, the armrest 40 supported from the retracted position which is the side of the console main body 20 to the rest position above the retracted position in a swingable manner to allow the occupant to place the arm thereon when the armrest 40 is located at the rest position, and the falling-of-belongings suppression mechanism 50 interlocked with swing of the armrest 40 to suppress falling of the belongings Hb placed on the placing portion 30. The console 10A (see FIG. 7B) is similar thereto.

While the vehicle is running, the belongings Hb may slip on the placing top surface 32*a*. When the armrest 40 is at the rest position, it is difficult to visually recognize that the belongings have slipped. The falling-of-belongings suppression mechanism 50 can suppress falling of the belongings Hb placed on the placing portion 30 when the armrest 40 is located at the rest position.

Referring to FIG. 3, second, in the first console 10, based on the time when the armrest 40 is located at the retracted position, the upper end portion 42 located at the upper end of the armrest 40 is located at a position higher than the placing portion 30. The console 10A (see FIG. 7A) is similar thereto.

Even when the armrest 40 is located at the retracted position, the belongings Hb placed on the placing portion 30 can be inhibited from falling from the console 10. In this instance, since the armrest 40 located at the retracted position is used, there is no need to increase the number of parts, which is advantageous.

Referring to FIG. 6, third, in the first or second console 10, the falling-of-belongings suppression mechanism 50 includes the cam 51 interlocked with swing of the armrest 40, and the fall suppression wall 52*b* provided at least partially between the console main body 20 and the placing portion 30 and displaced by the operation of the cam 51. When the armrest 40 is displaced from the retracted position to the rest position, the fall suppression wall 52*b* is raised above the top surface (placing top surface 32*a*) by the cam 51. When the armrest 40 is displaced from the rest position to the retracted position, the fall suppression wall 52*b* is lowered to approximately the same level as the top surface or lowered below the top surface. The belongings Hb can be inhibited from falling by a simple configuration. Further, the mechanism using the cam 51 can reduce the number of parts and the number of assembly steps when compared to using a mechanism such as a rack and pinion.

Referring to FIG. 7B, fourth, in the first or second console 10A, the falling-of-belongings suppression mechanism 50A includes the cam 51A interlocked with swing of the armrest 40. The placing portion 30A can be raised and lowered by the cam 51A. When the armrest 40 is displaced from the retracted position to the rest position, the placing portion 30A is lowered below the top surface (see the main body top surface 22) by the cam 51A, and when the armrest 40 is displaced from the rest position to the retracted position, the placing portion 30A is raised by the cam 51 to approximately the same level as the top surface. The belongings Hb can be inhibited from falling by a simple configuration. Further, the mechanism using the cam 51A can reduce the number of parts and the number of assembly steps when compared to using a mechanism such as a rack and pinion.

Note that, even though a console using two armrests has been described as an example of the console according to the invention, only one armrest may be used.

In addition, the fall suppression wall of the first embodiment and the placing portion main body of the second embodiment are lowered by weights thereof. However, to ensure stable operation, an urging force may be added downward by a spring, etc.

As long as the action and effect of the invention are achieved, the invention is not limited to the embodiments.

What is claimed is:

1. A console for vehicle, comprising:
   a console main body;
   a placing portion provided at a top of the console main body to allow belongings to be placed thereon;

an armrest supported from a retracted position which is a side of the console main body to a rest position above the retracted position in a swingable manner to allow an occupant to place an arm thereon when the armrest is located at the rest position; and a falling-of-belongings suppression mechanism interlocked with swing of the armrest and configured to suppress falling of the belongings placed on the placing portion when the armrest is located at the rest position.

2. The console for vehicle according to claim 1, wherein, based on a time when the armrest is located at the retracted position, an upper end portion located at an upper end of the armrest is located at a position higher than the placing portion.

3. The console for vehicle according to claim 1, wherein:

the falling-of-belongings suppression mechanism comprises a cam interlocked with swing of the armrest, and a fall suppression wall provided at least partially between the console main body and the placing portion and displaced by an operation of the cam, when the armrest is displaced from the retracted position to the rest position, the fall suppression wall is raised above a placing top surface included in a top surface of the placing portion by the cam, and when the armrest is displaced from the rest position to the retracted position, the fall suppression wall is lowered to approximately the same level as the placing top surface or lowered below the placing top surface.

4. The console for vehicle according to claim 1, wherein:

the falling-of-belongings suppression mechanism comprises a cam interlocked with swing of the armrest, the placing portion is allowed to be raised and lowered by the cam, when the armrest is displaced from the retracted position to the rest position, the placing portion is lowered below a main body top surface included in a top surface of the console main body by the cam, and when the armrest is displaced from the rest position to the retracted position, the placing portion is raised to approximately the same level as the main body top surface by the cam.

* * * * *